(12) United States Patent
Koyama

(10) Patent No.: US 12,275,857 B2
(45) Date of Patent: Apr. 15, 2025

(54) INKJET INK SET, INKJET RECORDING APPARATUS, AND INKJET RECORDING METHOD

(71) Applicant: KYOCERA Document Solutions Inc., Osaka (JP)

(72) Inventor: Akinori Koyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 210 days.

(21) Appl. No.: 18/173,653

(22) Filed: Feb. 23, 2023

(65) Prior Publication Data

US 2024/0287339 A1    Aug. 29, 2024

(51) Int. Cl.
| | | |
|---|---|---|
| *C09D 11/40* | (2014.01) | |
| *B41J 2/21* | (2006.01) | |
| *C09D 11/322* | (2014.01) | |
| *C09D 11/38* | (2014.01) | |

(52) U.S. Cl.
CPC ............. *C09D 11/40* (2013.01); *B41J 2/2114* (2013.01); *C09D 11/322* (2013.01); *C09D 11/38* (2013.01)

(58) Field of Classification Search
CPC ....... C09D 11/322; C09D 11/40; C09D 11/38; C09D 11/14; C09D 11/037; C09D 11/033; C09D 105/00; C09D 11/00; B41J 2/2117; B41J 2/2114; B41J 2/01; B41J 2/21

See application file for complete search history.

(56) References Cited

U.S. PATENT DOCUMENTS

| | | | |
|---|---|---|---|
| 11,124,666 B2 | 9/2021 | Okuda et al. | |
| 2017/0158896 A1* | 6/2017 | Double | C09D 11/40 |
| 2019/0134989 A1* | 5/2019 | Matsumoto | C09D 11/322 |
| 2019/0292392 A1 | 9/2019 | Okuda et al. | |

FOREIGN PATENT DOCUMENTS

JP    2019-167518 A    10/2019

* cited by examiner

*Primary Examiner* — Jannelle M Lebron
(74) *Attorney, Agent, or Firm* — Studebaker Brackett PLLC

(57) ABSTRACT

An inkjet ink set includes a nonwhite ink and a white ink. The nonwhite ink contains a nonwhite pigment, a first polysaccharide, glycol ether, and water. The white ink contains a white pigment and water. The nonwhite ink has a first surface tension of at least 30 mN/m and no greater than 40 mN/m. The first surface tension of the nonwhite ink and a second surface tension of the white ink satisfy formula (1) "5 mN/m≤Tc−Tw". The nonwhite ink has a first viscosity of at least 5.0 mPa·s and no greater than 10.0 mPa·s. The first viscosity of the nonwhite ink and a second viscosity of the white ink satisfy formula (2) "2.0 mPa·s≤Vc−Vw".

12 Claims, 1 Drawing Sheet

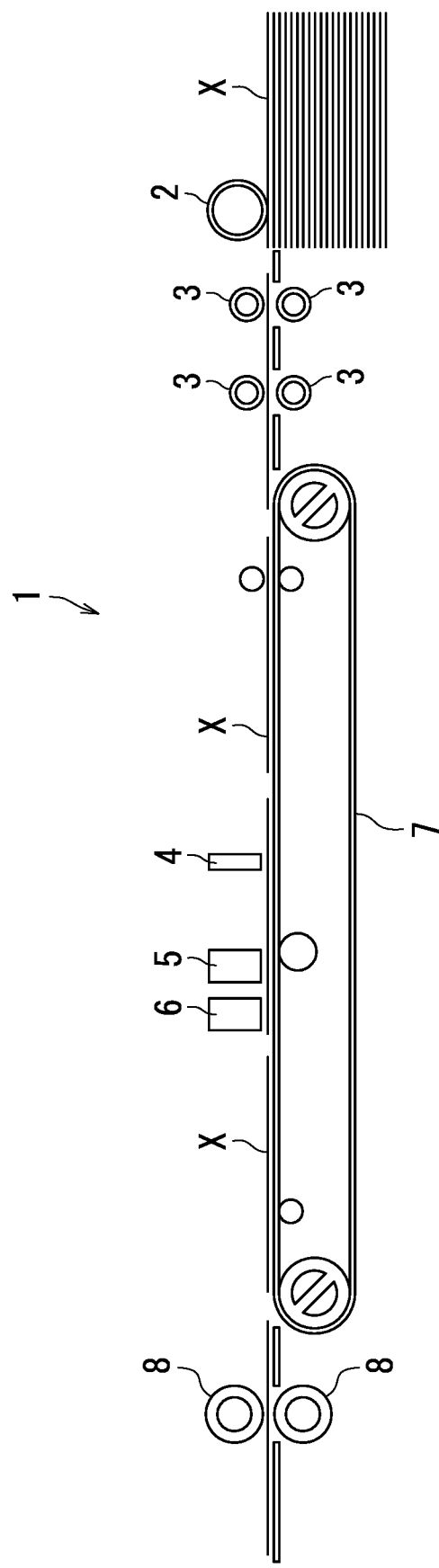

INKJET INK SET, INKJET RECORDING APPARATUS, AND INKJET RECORDING METHOD

BACKGROUND

The present disclosure relates to an inkjet ink set, an inkjet recording apparatus, and an inkjet recording method.

Low-absorbent recording mediums with low water absorption and non-absorbent recording mediums that do not absorb water may be used in label printing and package printing. Various inks are studied for image formation on the low-absorbent recording mediums and the non-absorbent recording mediums. For example, a water-based inkjet ink composition is known that includes a first ink composition and a second ink composition. The first ink composition has a solid content higher than that of the second ink composition by 5% by mass or more. The second ink composition contains an organic solvent with a percentage content higher than that of the first ink composition by 7% by mass or more.

SUMMARY

An inkjet ink set according to an aspect of the present disclosure includes a nonwhite ink and a white ink. The nonwhite ink contains a nonwhite pigment, a first polysaccharide, glycol ether, and water. The white ink contains a white pigment and water. The nonwhite ink has a first surface tension of at least 30 mN/m and no greater than 40 mN/m. The first surface tension of the nonwhite ink and a second surface tension of the white ink satisfy formula (1). The nonwhite ink has a first viscosity of at least 5.0 mPa·s and no greater than 10.0 mPa·s. The first viscosity of the nonwhite ink and a second viscosity of the white ink satisfy formula (2).

$$5 \text{ mN/m} \le Tc - Tw \quad (1)$$

$$2.0 \text{ mPa·s} \le Vc - Vw \quad (2)$$

In the formula (1), Tc represents the first surface tension of the nonwhite ink and Tw represents the second surface tension of the white ink. In the formula (2), Vc represents the first viscosity of the nonwhite ink and Vw represents the second viscosity of the white ink.

An inkjet recording apparatus according to an aspect of the present disclosure includes a first recording head that ejects a nonwhite ink toward a recording medium, and a second recording head that ejects a white ink toward an area of the recording medium where the nonwhite ink has been ejected. The nonwhite ink contains a nonwhite pigment, a first polysaccharide, glycol ether, and water. The white ink contains a white pigment and water. The nonwhite ink has a first surface tension of at least 30 mN/m and no greater than 40 mN/m. The first surface tension of the nonwhite ink and a second surface tension of the white ink satisfy formula (1). The nonwhite ink has a first viscosity of at least 5.0 mPa·s and no greater than 10.0 mPa·s. The first viscosity of the nonwhite ink and a second viscosity of the white ink satisfy formula (2).

$$5 \text{ mN/m} \le Tc - Tw \quad (1)$$

$$2.0 \text{ mPa·s} \le Vc - Vw \quad (2)$$

In the formula (1), Tc represents the first surface tension of the nonwhite ink and Tw represents the second surface tension of the white ink. In the formula (2), Vc represents the first viscosity of the nonwhite ink and Vw represents the second viscosity of the white ink.

An inkjet recording method according to an aspect of the present disclosure includes: ejecting a nonwhite ink toward a recording medium; and ejecting a white ink toward an area of the recording medium where the nonwhite ink has been ejected. The nonwhite ink contains a nonwhite pigment, a first polysaccharide, glycol ether, and water. The white ink contains a white pigment and water. The nonwhite ink has a first surface tension of at least 30 mN/m and no greater than 40 mN/m. The first surface tension of the nonwhite ink and a second surface tension of the white ink satisfy formula (1). The nonwhite ink has a first viscosity of at least 5.0 mPa·s and no greater than 10.0 mPa·s. The first viscosity of the nonwhite ink and a second viscosity of the white ink satisfy formula (2).

$$5 \text{ mN/m} \le Tc - Tw \quad (1)$$

$$2.0 \text{ mPa·s} \le Vc - Vw \quad (2)$$

In the formula (1), Tc represents the first surface tension of the nonwhite ink and Tw represents the second surface tension of the white ink. In the formula (2), Vc represents the first viscosity of the nonwhite ink and Vw represents the second viscosity of the white ink.

BRIEF DESCRIPTION OF THE DRAWINGS

FIGURE illustrates an example of an inkjet recording apparatus according to a second embodiment of the present disclosure.

DETAILED DESCRIPTION

The terms used in the present specification will be explained first. In the following, the term "(meth)acryl" is used as a generic term for both acryl and methacryl. The term mass average molecular weight means a mass average molecular weight in terms of polystyrene as measured by gel permeation chromatography unless otherwise stated. The term surface tension means a value as measured using a surface tensiometer in an environment at 25° C. based on the Wilhelmy plate method unless otherwise stated. The term viscosity means a value as measured using a vibration type viscometer in an environment at 25° C. unless otherwise stated. Each component described in the present specification may be used independently or in combination of two or more types thereof. The terms used in the present specification have been explained so far.

First Embodiment: Inkjet Ink Set

An inkjet ink set (also referred to below as ink set) according to a first embodiment of the present disclosure includes a nonwhite ink and a white ink.

The nonwhite ink contains a nonwhite pigment, a first polysaccharide, glycol ether, and water. The nonwhite ink may further contain a binder resin, a water-soluble organic solvent that is not glycol ether, and a first surfactant as necessary.

The white ink contains a white pigment and water. The white ink may further contain a second polysaccharide, a binder resin, glycol ether, a water-soluble organic solvent that is not glycol ether, and a second surfactant as necessary. However, the white ink may not contain glycol ether in a case in which occurrence of unevenness can be inhibited in image formation.

In the following, the "water-soluble organic solvent that is not glycol ether" may be referred to as "different water-soluble organic solvent". Furthermore, the "first polysaccharide", the "glycol ether", the "water", the "binder resin", the "different water-soluble organic solvent", and the "first surfactant" contained in the nonwhite ink may be respectively referred to as "polysaccharide C", "glycol ether C", "water C", "binder resin C", "different water-soluble organic solvent C", and "surfactant C". Also, the "second polysaccharide", the "water", the "binder resin", the "glycol ether", the "different water-soluble organic solvent", and the "second surfactant" contained in the white ink may be respectively referred to as "polysaccharide W", "water W", "binder resin W", "glycol ether W", "different water-soluble organic solvent W", and "surfactant W".

Note that where there is no need to distinguish, the "nonwhite ink" and the "white ink" may be generally referred to as "inks", and the "nonwhite pigment" and the "white pigment" may be generally referred to as "pigments". Also, where there is no need distinguish: the "polysaccharide C" and the "polysaccharide W" may be generally referred to as "polysaccharides"; the "water C" and the "water W" may be generally referred to as "water"; the "binder resin C" and the "binder resin W" may be generally referred to as "binder resins"; the "glycol ether C" and the "glycol ether W" may be generally referred to as "glycol ethers": the "different water-soluble organic solvent C" and the "different water-soluble organic solvent W" may be generally referred to as "different water-soluble organic solvents"; and the "surfactant C" and the "surfactant W" may be generally referred to as "surfactants".

The ink set of the first embodiment can inhibit occurrence of unevenness in a formed image in formation of the image on a low-absorbent recording medium or a non-absorbent recording medium. In the following, "the low-absorbent recording medium and the non-absorbent recording medium" may be generally referred to as "specific recording mediums". The ink set of the first embodiment can be used in the following manner, for example. The nonwhite ink and the white ink are accommodated in different containers, for example. First, a nonwhite image is formed on a specific recording medium (e.g., a transparent specific recording medium) with the nonwhite ink included in the ink set. Next, a white solid image (underlying image) is formed on the nonwhite image with the white ink included in the ink set. The ink set of the first embodiment is used in back printing, for example. The term back printing means printing an image so that the image is viewed from a side opposite to the printed side (side toward which the nonwhite ink and the white ink have been ejected) of the specific recording medium.

As described previously, the nonwhite ink contains the glycol ether C in the first embodiment. The nonwhite ink directly ejected to the specific recording medium needs to wet and spread over the specific recording medium. As a result of the nonwhite ink containing the glycol ether C which is highly hydrophobic, the nonwhite ink favorably wets and spreads over the specific recording medium with low or no water absorption.

As described previously, the nonwhite ink contains the polysaccharide C in the first embodiment. Although the nonwhite ink to be directly ejected toward the specific recording medium needs to wet and spread over the specific recording medium, excessive wetting and spreading of the nonwhite ink may cause unevenness in the formed nonwhite image. When the nonwhite ink contains the polysaccharide C, the nonwhite ink landed on the specific recording medium moderately thickens. As a result, the nonwhite ink evenly and moderately wets and spreads over the specific recording medium without excessive wetting and spreading.

The nonwhite ink has a first surface tension of at least 30 mN/m and no greater than 40 mN/m. In the following, the "first surface tension of the nonwhite ink" may be referred to as "surface tension Tc" and a later-described "second surface tension of the white ink" may be referred to as "surface tension Tw". As a result of the surface tension Tc being set to at least 30 mN/m and no greater than 40 mN/m, the nonwhite ink can evenly and moderately wet and spread over the specific recording medium. Accordingly, occurrence of unevenness can be inhibited in the nonwhite image formed on the specific recording medium.

The surface tension Tc and the surface tension Tw satisfy formula (1). In formula (1), Tc represents the surface tension Tc and Tw represents the surface tension Tw. In the following, a value calculated using a formula "Tc−Tw" may be referred to as "Tc−Tw value".

$$5 \text{ mN/m} \leq Tc - Tw \tag{1}$$

When the Tc−Tw value is less than 5 mN/m, it is hard for the white ink to wet and spread over the nonwhite image formed with the nonwhite ink with a result that an area with a white image (underlying image) and an area therewithout may be formed. Unevenness accordingly occurs in an image including the nonwhite image and the white image overlaid thereon. In the first embodiment, the Tc−Tw value is at least 5 mN/m. That is, the surface tension Tc of the nonwhite ink is greater than the surface tension Tw of the white ink by 5 mN/m or more. Therefore, the white ink wets and spreads over the nonwhite image formed with the nonwhite ink to inhibit occurrence of unevenness in the image including the nonwhite image and the white image overlaid thereon. The upper limit of the Tc−Tw value is not limited particularly and may be no greater than 12 mN/m, for example.

The amount of the surfactant C is preferably at least 0.30 parts by mass and no greater than 0.80 parts by mass relative to 100.00 parts by mass of the nonwhite ink. The amount of the surfactant W is preferably at least 0.50 parts by mass and no greater than 1.00 part by mass relative to 100.00 parts by mass of the white ink. Setting the amount of the surfactant C within the above range makes it easy to adjust the surface tension Tc within a specific range. Furthermore, setting the amount of the surfactant C within the above range and setting the amount of the surfactant W within the above range make it easy to adjust the surface tension Tc and the surface tension Tw so as to satisfy formula (1).

In terms of easy adjustment of the surface tension Tc and the surface tension Tw for satisfying formula (1), a difference (Msw−Msc) between a mass (Msc) of the surfactant C relative to 100.00 parts by mass of the nonwhite ink and a mass (Msw) of the surfactant W relative to 100.00 parts by mass of the white ink is preferably at least 0.20 parts by mass and no greater than 0.70 parts by mass.

(Viscosity)

The nonwhite ink has a first viscosity of at least 5.0 mPa·s and no greater than 10.0 mPa·s. In the following, the "first viscosity of the nonwhite ink" may be referred to as "viscosity Vc" and a later-described "second viscosity of the white ink" may be referred to as "viscosity Vw". As a result of the viscosity Vc being set to at least 5.0 mPa·s and no greater than 10.0 mPa·s, the nonwhite ink can evenly and moderately wet and spread over the specific recording medium. Accordingly, occurrence of unevenness can be inhibited in the nonwhite image formed on the specific recording medium.

The viscosity Vc and the viscosity Vw satisfy formula (2). In formula (2), Vc represents the viscosity Vc and Vw represents the viscosity Vw. In the following, a value calculated using the formula "Vc−Vw" may be referred to as "Vc−Vw value"

$$2.0 \text{ mPa·s} \leq Vc-Vw \tag{2}$$

When the Vc−Vw value is less than 2.0 mPa·s, it is hard for the white ink to wet and spread over the nonwhite image formed with the nonwhite ink with a result that an area with a white image (underlying image) and an area therewithout are formed. Unevenness accordingly occurs in the image including the nonwhite image and the white image overlaid thereon. In the first embodiment, the Vc−Vw value is at least 2.0 mPa·s. That is, the viscosity Vc of the nonwhite ink is higher than the viscosity Vw of the white ink by 2.0 mPa·s or more. Therefore, the white ink wets and spreads over the nonwhite image formed with the nonwhite ink to inhibit occurrence of unevenness in the image including the nonwhite image and the white image overlaid thereon. The upper limit of the Vc−Vw value is not limited particularly and may be no greater than 6.0 mPa·s, for example. The Vc−Vw value is preferably at least 2.0 mPa·s and no greater than 2.6 mPa·s, more preferably at least 2.1 mPa·s and no greater than 2.6 mPa·s, and further preferably at least 2.5 mPa·s and no greater than 2.6 mPa·s.

The amount of the polysaccharide C is preferably at least 0.02 parts by mass and no greater than 0.12 parts by mass relative to 100.00 parts by mass of the nonwhite ink. By contrast, the white ink preferably does not contain the polysaccharide W. Alternatively, the white ink contains the polysaccharide W, the amount of which is preferably greater than 0.00 parts by mass and no greater than 0.10 parts by mass relative to 100.00 parts by mass of the white ink. Setting the amount of the polysaccharide C within the above range makes it easy to adjust the viscosity Vc within a specific range. Furthermore, setting the amount of the polysaccharide C within the above range and no containment of the polysaccharide W or setting the amount of the polysaccharide W within the above range make it easy to adjust the viscosity Vc and the viscosity Vw so as to satisfy formula (2).

In terms of easy adjustment of the viscosity Vc and the viscosity Vw for satisfying formula (2), a difference (Mpc−Mpw) between a mass (Mpc) of the polysaccharide C relative to 100.00 parts by mass of the nonwhite ink and a mass (Mpw) of the polysaccharide W relative to 100.00 parts by mass of the white ink is preferably at least 0.02 parts by mass and no greater than 0.04 parts by mass.

Components contained in the nonwhite ink and the white ink will be described next.

(Polysaccharides)

As a result of the inks each containing a polysaccharide, the viscosity of the inks landed on the specific recording medium moderately increases and it is easy to adjust the viscosity Vc and the Vc−Vw value within the respective specific ranges.

The polysaccharide C and the polysaccharide W each are preferably a cellulose derivative or a salt thereof. Examples of the cellulose derivative and the salt thereof include sodium salt of carboxymethyl cellulose (also referred to below as sodium carboxymethylcellulose), calcium salt of carboxymethyl cellulose, methylcellulose, hydroxypropyl methylcellulose, hydroxypropyl cellulose, ethylcellulose, and methylethylcellulose.

In terms of easy adjustment of the viscosity Vc and the Vc−Vw value within the respective specific ranges, the polysaccharide C and the polysaccharide W are preferably sodium carboxymethylcellulose, methylcellulose, or hydroxypropyl methylcellulose, and more preferably sodium carboxymethylcellulose. Note that the polysaccharide C and the polysaccharide W may be the same as or different from each other.

Carboxymethyl cellulose has a structure in which a carboxymethyl group is ether-bonded to a hydroxyl group in an anhydroglucose unit of cellulose (in other words, structure in which a hydrogen atom of a hydroxyl group in an anhydroglucose unit is substituted with a carboxymethyl group). In terms of easy adjustment of the viscosity Vc and the Vc−Vw value within the respective specific ranges, the degree of etherification of sodium carboxymethylcellulose is preferably at least 0.6 and no greater than 1.5, and more preferably at least 0.8 and less than 1.0 or at least 1.0 and no greater than 1.5. In the present specification, the degree of etherification of sodium carboxymethylcellulose means an average of the numbers of moles of the carboxymethyl group per 1 mol of anhydrous glucose unit.

Sodium carboxymethylcellulose may be commercially available sodium carboxymethylcellulose. Examples of commercially available sodium carboxymethylcellulose with a degree of esterification of at least 0.6 and no greater than 1.5 include CMC DAICEL (registered Japanese trademark) 1120, CMC DAICEL 1130, CMC DAICEL 1140, CMC DAICEL 1150, CMC DAICEL 1220, CMC DAICEL 1240, CMC DAICEL 1250, CMC DAICEL 1260, CMC DAICEL 1330, and CMC DAICEL 1350 produced by Daicel Miraizu Ltd.

Preferably, a 1%-by-mass aqueous solution of sodium carboxymethylcellulose at 25° C. has a viscosity of at least 10 mPa·s and no greater than 300 mPa·s. As a result of the viscosity of the 1%-by-mass aqueous solution of sodium carboxymethylcellulose at 25° C. being set within the above range, each viscosity of the inks can be easily adjusted within a range suitable for inkjet recording. The viscosity of the 1%-by-mass aqueous solution of sodium carboxymethylcellulose can be measured using a vibration type viscometer (product of Sekonic cooperation, tradename: VM-10A-L), for example.

(Glycol Ethers)

The nonwhite ink essentially contains the glycol ether C. Glycol ether is relatively highly hydrophobic. As a result of the nonwhite ink containing the glycol ether C which is highly hydrophobic, the nonwhite ink readily wets and spreads over the specific recording medium with low or no water absorption. Accordingly, occurrence of unevenness in the formed nonwhite image can be inhibited when the nonwhite ink is directly ejected toward the specific recording medium. The white ink may contain the glycol ether W as necessary. However, the white ink may not contain the glycol ether W because the white ink is not directly ejected toward the specific recording medium.

In order to inhibit occurrence of unevenness in the formed image, the glycol ether C is preferably at least one (e.g., one or two) selected from the group consisting of propylene glycol monomethyl ether, propylene glycol monopropyl ether, dipropylene glycol monomethyl ether, dipropylene glycol monopropyl ether, and triethylene glycol monobutyl ether.

The amount of the glycol ether C is preferably at least 3 parts by mass and no greater than 20 parts by mass relative to 100 parts by mass of the nonwhite ink, and more preferably at least 5 parts by mass and no greater than 15 parts by mass. As a result of the amount of the glycol ether C being set to at least 3 parts by mass relative to 100 parts by mass of the nonwhite ink, the nonwhite ink has increased wettability to the specific recording medium to inhibit occurrence of unevenness in the formed image. As a result of the amount of the glycol ether C being set to no greater than 20 parts by mass relative to 100 parts by mass of the nonwhite ink, the nonwhite pigment favorably disperses in the nonwhite ink.

From the viewpoint of favorable drying of the nonwhite ink landed on the specific recording medium, the percentage content of the glycol ether C is preferably at least 20% by mass and no greater than 80% by mass to the total mass of the glycol ether C and the different water-soluble organic solvent C, more preferably at least 30% by mass and no greater than 80% by mass, and further preferably at least 60% by mass and no greater than 70% by mass.

(Different Water-Soluble Organic Solvents)

Examples of the different water-soluble organic solvents include 1,2-propanediol (i.e., propylene glycol), 3-methyl-1,3-butanediol, 1,2-pentanediol, 2-methyl-1,3-propanediol, 1,3-propanediol, dipropylene glycol, 1,5-pentanediol, 3-methyl-1,5-pentanediol, ethylene glycol, 2-pyrrolidone, and glycerin.

The different water-soluble organic solvents are preferably alkane polyol, more preferably alkanediol, further preferably alkanediol having a carbon number of at least 2 and no greater than 6, and particularly preferably propylene glycol.

From the viewpoint of favorable drying of the inks landed on the specific recording medium, the amount of each different water-soluble organic solvent is preferably at least 0.1 parts by mass and no greater than 20 parts by mass relative to 100 parts by mass of the corresponding ink, and more preferably at least 1 part by mass and no greater than 10 parts by mass. Note that the amount of an organic solvent (e.g., a water-soluble organic solvent) contained in the white ink may be larger or smaller than or the same as the amount of an organic solvent (e.g., a water-soluble organic solvent) contained in the nonwhite ink.

(Water)

The water contained in each ink is ion exchange water (deionized water), for example. From the viewpoint of favorable drying of the inks landed on the specific recording medium, the percentage content of the water in each ink is preferably at least 40% by mass and no greater than 80% by mass to the mass of the ink.

(Nonwhite Pigment and White Pigment)

Examples of the white pigment include C.I. Pigment White 4, C.I. Pigment White 5, C.I. Pigment White 6, C.I. Pigment White 6:1, C.I. Pigment White 7, C.I. Pigment White 18, C.I. Pigment White 19, C.I. Pigment White 20, C.I. Pigment White 21, C.I. Pigment White 23, C.I. Pigment White 24, C.I. Pigment White 25, C.I. Pigment White 26, C.I. Pigment White 27, and C.I. Pigment White 28. Alternatively, titanium oxide may be used as the nonwhite pigment.

From the viewpoint of favorable ejection of the white ink from a recording head, the percentage content of the white pigment is preferably at least 0.1% by mass and no greater than 30% by mass to the mass of the white ink and more preferably at least 10% by mass and no greater than 20% by mass.

No particular limitations are placed on the nonwhite pigment, and examples of the nonwhite pigment include black pigments, cyan pigments, magenta pigments, yellow pigments, and pigments (also referred to below as other pigments) other than these.

Examples of the black pigments include carbon black produced by the furnace method or the channel method. Examples of commercially available carbon black include RAVEN (registered Japanese trademark) 5000 ULTRA II, RAVEN 3500, RAVEN 2000, RAVEN 1255, RAVEN 1250, RAVEN 1200, RAVEN 1190 ULTRA, RAVEN 1170, RAVEN 1080 ULTRA, and RAVEN 1060 ULTRA produced by Aditya Birla Chemicals LTD. Other examples of the commercially available carbon black include MONARCH (registered Japanese trademark) 1300, MONARCH 1000, MONARCH 800, MONARCH 700, MOGUL (registered Japanese trademark) L, REGAL (registered Japanese trademark) 400R, REGAL 660R, and REGAL 330R produced by Cabot Corporation Still other examples of the commercially available carbon black include MITSUBISHI (registered Japanese trademark) CARBON BLACK #2300, MITSUBISHI CARBON BLACK #980, MITSUBISHI CARBON BLACK #970, MITSUBISHI CARBON BLACK #960, MITSUBISHI CARBON BLACK #950, MITSUBISHI CARBON BLACK #900, MITSUBISHI CARBON BLACK #850, MITSUBISHI CARBON BLACK MCF88, MITSUBISHI CARBON BLACK MA600, MITSUBISHI CARBON BLACK #52, MITSUBISHI CARBON BLACK #47, MITSUBISHI CARBON BLACK #45, MITSUBISHI CARBON BLACK #40, MITSUBISHI CARBON BLACK #33, MITSUBISHI CARBON BLACK #25, MITSUBISHI CARBON BLACK MA7, MITSUBISHI CARBON BLACK MA8, and MITSUBISHI CARBON BLACK MA100 produced by Mitsubishi Chemical Corporation. Still other examples of the commercially available carbon black include COLOUR BLACK FW 1, COLOUR BLACK FW 2, COLOUR BLACK FW 200, COLOUR BLACK FW 18, SPECIAL BLACK 6, COLOUR BLACK S 160, SPECIAL BLACK 5, PRINTEX (registered Japanese trademark) U, PRINTEX V, SPECIAL BLACK 4, SPECIAL BLACK 4A, PRINTEX 140 U, PRINTEX 140 V and PRINTEX 35 produced by Orion Engineered Carbons KK.

Examples of the cyan pigments include C.I. Pigment Blue 1, C.I. Pigment Blue 2, C.I. Pigment Blue 3, C.I. Pigment Blue 15:3, C.I. Pigment Blue 15:4, C.I. Pigment Blue 16, C.I. Pigment Blue 22, C.I. Vat Blue 4, and C.I. Vat Blue 6.

Examples of the magenta pigments include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 184, C.I. Pigment Red 202, and C.I. Pigment Violet 19.

Examples of the yellow pigments include C.I. Pigment Yellow 12, C.I. Pigment Yellow 13, C.I. Pigment Yellow 14, C.I. Pigment Yellow 17, C.I. Pigment Yellow 74, C.I. Pigment Yellow 83, C.I. Pigment Yellow 93, C.I. Pigment Yellow 94, C.I. Pigment Yellow 95, C.I. Pigment Yellow 120, C.I. Pigment Yellow 128, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Examples of the other pigments include C.I. Pigment Green 7, C.I. Pigment Green 10, C.I. Pigment Green 36, C.I. Pigment Brown 3, C.I. Pigment Brown 5, C.I. Pigment Brown 25, C.I. Pigment Brown 26, C.I. Pigment Orange 2, C.I. Pigment Orange 5, C.I. Pigment Orange 7, C.I. Pigment Orange 13, C.I. Pigment Orange 14, C.I. Pigment Orange 15, C.I. Pigment Orange 16, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 62, C.I. Pigment Orange 63, C.I. Pigment Orange 64, and C.I. Pigment Orange 71.

From the viewpoint of favorable ejection of the nonwhite ink from a recording head, the percentage content of the nonwhite pigment is preferably at least 0.1% by mass and no greater than 15% by mass to the mass of the nonwhite ink, and more preferably at least 0.5% by mass and no greater than 5% by mass.

Each pigment is favorably used in a state of being dispersed in a dispersion medium (e.g., water). A method for dispersing the pigment is not limited particularly and may be a method in which the pigment is dispersed in the dispersion medium using a dispersant or a method in which the pigment is dispersed in the dispersion medium without using a dispersant, for example. The pigments may each be a pigment (non-self-dispersion type pigment) dispersed in the dispersion medium by a dispersant or a pigment (self-dispersion type pigment) dispersed in the dispersion medium without a dispersant. Examples of the dispersant include a surfactant and a polymer dispersant (also referred to below as "pigment dispersion resin"). Note that the surfactant will be descried later.

The pigment dispersion resin attaches to the surfaces of pigment particles to disperse the pigment particles in each ink. Note that a portion of the pigment dispersion resin may be free in the ink without attaching to the surfaces of the pigment particles. Examples of the pigment dispersion resin include acrylic resin, styrene-(meth)acrylic resin, styrene-maleic acid resin, and urethane resin. From the viewpoint of stable dispersion of the pigment, the pigment dispersion resin is preferably (meth)acrylic resin or styrene-(meth) acrylic resin.

The pigment dispersion resin has a mass average molecular weight of preferably at least 5000 and no greater than 100,000, more preferably at least 10,000 and no greater than 50,000, and further preferably at least 15,000 and no greater than 30,000. As a result of the mass average molecular weight of the pigment dispersion resin being set to at least 5000, the inks can have increased dispersion stability. As a result of the mass average molecular weight of the pigment dispersion resin being set to no greater than 100,000, the inks can be favorably ejected from the recording heads.

The ratio of the mass of the pigment dispersion resin to the mass of the corresponding pigment is preferably at least 0.02 and no greater than 0.45, more preferably at least 0.04 and no greater than 0.40, and further preferably at least 0.05 and no greater than 0.35. As a result of the ratio of the mass of the pigment dispersion resin to the mass of the corresponding pigment being set to no greater than 045, the viscosities of the pigment dispersions and the inks can be easily adjusted to respective desired values. As a result of the ratio of the mass of the pigment dispersion resin to the mass of the corresponding pigment being set to at least 0.02, the ink can have increased dispersion stability.

The pigment dispersion resin may be a commercially available pigment dispersion resin. Examples of the commercially available pigment dispersion resin include JONCRYL (registered Japanese trademark) 586 and JONCRYL 611 produced by BASF Japan Ltd.; DISPERBYK (registered Japanese trademark)-190 and DISPERBYK-191 produced by BYK Chemie Japan, K.K.; and SOLSPERSE 20000 and SOLSPERSE 27000 produced by Lubrizol Japan Limited.

(Binder Resins)

Each ink preferably contains a binder resin. The binder resin binds the pigment in the ink to the recording medium once the ink lands on the recording medium. As a result of each ink containing a binder resin, the pigments are favorably bound to a recording medium for example by heating, thereby achieving formation of images with favorable scratch resistance. In addition, as a result of each ink containing a binder resin, the pigments are favorably bound to the recording medium to inhibit occurrence of unevenness in the formed images.

The binder resin is a water-insoluble resin, for example. No particular limitations are placed on the binder resin and examples of the binder resin include urethane resin, (meth) acrylic resin, styrene-(meth)acrylic resin, (meth)acryl-urethane resin, polyester resin, and modified polyolefin resin.

The nonwhite ink and the white ink each preferably contain a water-insoluble resin as the binder resin, and more preferably contain urethane resin, (meth)acrylic resin, or styrene-(meth)acrylic resin, and further preferably contain urethane resin (e.g., polyisocyanate).

The water-insoluble resin is preferably used in the state of resin emulsion. In a case in which the water-insoluble resin is used in the stated of resin emulsion, the inks contain emulsified particles constituted by the water-insoluble resin. The resin emulsion may be a commercially available resin emulsion.

The urethane resin is not limited particularly so long as it has a urethane bond in its molecule. Examples of commercially available urethane resin emulsions include: SUPERFLEX (registered Japanese trademark) 170, SUPERFLEX 210 SUPERFLEX 820, and SUPERFLEX 870 produced by DKS Co. Ltd.; and TAKELAC (registered Japanese trademark) W-6010 and TAKELAC W-6020 produced by Mitsui Chemicals, Inc.

Examples of commercially available (meth)acrylic resin emulsions include: MOWINYL (registered Japanese trademark) 6718, MOWINYL 6751D, MOWINYL 6750, MOWINYL 6760, MOWINYL 6770, MOWINYL 6800, MOWINYL 6969D, MOWINYL 6899D, and MOWINYL 6820 produced by Japan Coating Resin Corporation.

Examples of commercially available styrene-(meth) acrylic resin emulsions include: MOWINYL 6960, MOWINYL 6963, and MOWINYL RS-009C22 produced by Japan Coating Resin Corporation; and QE-1042 produced by SEIKO PMC CORPORATION.

From the viewpoint of favorable ejection of the inks from the recording heads, the percentage content of the binder resin is preferably at least 1% by mass and no greater than 10% by mass to the mass of each ink.

(Surfactants)

Examples of the surfactants include an acetylene surfactant, an acrylic surfactant, a silicone surfactant, and a fluoric surfactant. The surfactants may each be a commercially available surfactant.

In the present specification, the acetylene surfactant means a surfactant having an acetylene bond (carbon-atom triple bond) in its molecule. Examples of commercially available acetylene surfactants include SURFYNOL (registered Japanese trademark) 420, SURFYNOL 440, OLFINE (registered Japanese trademark) E1010, OLFINE EXP. 4200, and OLFINE EXP. 4300 produced by Nissin Chemical Industry Co., Ltd.

The acrylic surfactant in the present specification means a surfactant of a polymer of (meth)acrylic acid or a derivative thereof. Examples of commercially available acrylic surfactants include: BYK (registered Japanese trademark)-380 N and BYK-381 produced by BYK Chemie Japan, K.K.; and POLYFLOW KL-850 produced by Kyoeisha Chemical Co., Ltd.

In the present specification, the silicone surfactant means a surfactant having a siloxane bond in its molecule. Examples of commercially available silicone surfactants include SILFACE (registered Japanese trademark) SAG002 and SILFACE SAG503A produced by Nissin Chemical Industry Co., Ltd.

In the present specification, the fluoric surfactant means a surfactant having a fluoro group in its molecule. Examples of commercially available fluoric surfactants include CAPSTONE FS-30, CAPSTONE FS-31, CAPSTONE FS-65, and CATPSTONE FS-3100 produced by Chemours.

From the viewpoint of favorable ejection of the inks from the recording heads, the surfactants each are preferably an acetylene surfactant or an acrylic surfactant.

In terms of easy adjustment of the surface tension Tc and the Tc–Tw value within the respective specific ranges, the HLB value of the surfactant C and the HLB value of the surfactant W each are preferably at least 2 and no greater than 6, more preferably at least 3 and no greater than 5, and further preferably 4. The HLB value of the surfactant C may be the same as or different from the HLB value of the surfactant W.

(Other Components)

The nonwhite ink and the white ink may each contain any other components as necessary. Examples of the other components include a pH adjuster, a chelating agent, a preservative, and an antifungal agent. The percentage contents of the other components are not limited particularly and may be set as appropriate according to necessity.

(Nonwhite Ink Production Method and White Ink Production Method)

A nonwhite ink production method and a white ink production method each include preparing a pigment dispersion and mixing, for example.

In the preparing a pigment dispersion in the nonwhite ink production method, the nonwhite pigment, the water C, and a dispersant as necessary are mixed for example using a disperser. In the preparing a pigment dispersion in the white ink production method, the white pigment, the water W, and a dispersant as necessary are mixed for example using a disperser No particular limitations are placed on the disperser and examples of the disperser include a ball mill and a bead mill. Among them, the bead mill is preferably used. Examples of the bead mill include ATTRITOR (registered Japanese trademark) produced by Nippon Coke & Engineering Co., Ltd., a sand grinder produced by Aimex Co. Ltd., DYNO (registered Japanese trademark) MILL produced by Willy A Bachofen AG, and ULTRA APEX MILL produced by Hiroshima Metal & Machinery Co., Ltd. Where the resultant pigment dispersion contains coarse particles, the coarse particles are preferably removed by filtration or centrifugation.

In the mixing in the nonwhite ink production method, a nonwhite pigment dispersion containing the nonwhite pigment, the polysaccharide C, the glycol ether C, the water C, and a component added as necessary are mixed to obtain the nonwhite ink. In the mixing in the white ink production method, a white pigment dispersion containing the white pigment, the water W, and a component added as necessary are mixed to obtain the white ink. Where the resultant nonwhite ink or white ink contains coarse particles, the coarse particles are preferably removed by filtration or centrifugation.

Second Embodiment: Inkjet Recording Apparatus

The following describes an inkjet recording apparatus 1, which is an example of an inkjet recording apparatus according to a second embodiment of the present disclosure, with reference to FIGURE. FIGURE illustrates the inkjet recording apparatus 1 according to the second embodiment.

The inkjet recording apparatus 1 of the second embodiment includes a sheet feed roller 2, a plurality of conveyance roller pairs 3, a sensor 4, a first recording head 5, a second recording head 6, a conveyor belt 7, and an ejection roller pair 8.

In the second embodiment, a nonwhite ink to be ejected from the first recording head 5 and a white ink to be ejected from the second recording head 6 are respectively the nonwhite ink and the white ink of the ink set according to the first embodiment. As such, the inkjet recording apparatus 1 of the second embodiment can inhibit occurrence of unevenness in a formed image in image formation on the specific recording medium for the reasons previously described in the first embodiment.

The inkjet recording apparatus 1 accommodates multiple sheets of a recording medium X in a sheet feed cassette (not illustrated). Examples of the recording medium X include the specific recording mediums. Examples of low-absorbent recording mediums with low water absorption among the specific recording mediums include art paper, coated paper, photo printing paper, and cast coated paper. Examples of non-absorbent recording mediums with no water absorption among the specific recording mediums include foil paper, synthetic paper, and plastic substrates. Examples of the plastic substrates include polyester (e.g., polyethylene terephthalate (PET)) substrates, polypropylene substrates, polystyrene substrates, and polyvinyl chloride substrates. One side or both sides of the specific recording mediums may be subjected to surface treatment. Examples of the surface treatment include corona discharge treatment, plasma treatment, and primer treatment.

The sheet feed roller 2 feeds the topmost sheet of the sheets of the recording medium X one at a time by rotation thereof.

The conveyance roller pairs 3 convey the fed sheet of the recording medium X to the conveyor belt 7.

The conveyor belt 7 is an endless belt horizontally wound between a pair of rollers. The sheet of the recording medium X conveyed by the conveyance roller pairs 3 is conveyed to the ejection roller pair 8 by circulation of the conveyor belt 7.

The sensor 4 is disposed above the conveyor belt 7. The sensor 4 is disposed upstream of the first recording head 5 in terms of a conveyance direction of the sheet of the recording medium X. The sensor 4 detects the leading edge of the sheet of the recording medium X conveyed by the conveyor belt 7. With reference to the time when the sensor 4 detects the leading edge of the sheet of the recording medium X, an instruction to eject the nonwhite ink is input to the first recording head 5 and an instruction to eject the white ink is input to the second recording head 6.

The first recording head 5 and the second recording head 6 are disposed above the conveyor belt 7. The first recording head 5 is disposed upstream of the second recording head 6 in terms of a direction of conveyance by the conveyor belt 7 (corresponding to the conveyance direction of the recording medium X). The first recording head 5 and the second recording head 6 each are a long recording head of line scan type with a width that is the same as or larger than the width of the sheet of the recording medium X. The first recording head 5 and the second recording head 6 each include many nozzles in the lower surface (ejection surface) thereof that is opposite to the conveyor belt 7. The first recording head 5 and the second recording head 6 extend in a direction perpendicular to the conveyance direction of the sheet of the recording medium X and are fixed to the inkjet recording apparatus 1. Furthermore, the first recording head 5 and the second recording head 6 are fixed to the inkjet recording apparatus 1 so that the lower surfaces thereof are out of contact with the sheet of the recording medium X placed on the conveyor belt 7.

The first recording head 5 accommodates the nonwhite ink included in the ink set of the first embodiment. In the course of the conveyor belt 7 conveying the sheet of the recording medium X, the first recording head 5 (specifically, the many nozzles of the first recording head 5) ejects the nonwhite ink toward the sheet of the recording medium X. As a result, a nonwhite image is formed on the sheet of the recording medium X.

The second recording head 6 accommodates the white ink included in the ink set of the first embodiment. After the nonwhite ink is ejected from the first recording head 5, the second recording head 6 (specifically, the many nozzles of the second recording head 6) ejects the white ink toward the sheet of the recording medium X. Specifically, the second recording head 6 ejects the white ink toward an area of the sheet of the recording medium X where the nonwhite ink has been ejected. The white ink may be ejected toward the entirety of the sheet of the recording medium X. However, because an underlying image can be formed With a small amount of the white ink, the white ink is preferably ejected only toward an area of the sheet of the recording medium X where the nonwhite ink has been ejected or an area that is a part of the sheet of the recording medium X and that is wider than the area where the nonwhite ink has been ejected.

The sheet of the recording medium X toward which the white ink has been ejected from the second recording head 6 is further conveyed by the conveyor belt 7. Thereafter, the sheet of the recording medium X is delivered to the ejection roller pair 8 at the terminal of the conveyor belt 7 and then discharged from the conveyor belt 7.

The ejection roller pair 8 ejects the sheet of the recording medium X out of the inkjet recording apparatus 1. In the manner described above, an underlying image is formed with the nonwhite ink on the sheet of the recording medium X and a white image is formed with the white ink on the underlying image.

Note that the nonwhite ink and the white ink do not need to be pre-mixed, and therefore, the inkjet recording apparatus 1 need not include a mixer for mixing the two inks. As such, the apparatus configuration of the inkjet recording apparatus 1 can be simplified.

The inkjet recording apparatus 1, which is an example of the inkjet recording apparatus according to the second embodiment, has been described so far with reference to FIGURE. However, the inkjet recording apparatus of the second embodiment is not limited to the inkjet recording apparatus 1 and can be altered as in the following first to fourth variations.

The first variation is as follows. In the inkjet recording apparatus 1, the recording medium X used is cut into a specific size (e.g., A4 size) as an example. However, a rolled recording medium may be used.

The second variation is as follows. The inkjet recording apparatus 1 includes two recording heads of the first recording head 5 and the second recording head 6 as an example. However, the inkjet recording apparatus of the second embodiment may include three or more recording heads. For example, as a result of a plurality of recording heads for nonwhite ink ejection being provided, multi-color images can be formed.

The third variation is as follows. The inkjet recording apparatus 1 does not include a wiping blade as an example. However, the inkjet recording apparatus of the second embodiment may include wiping blades that wipe the ejection surfaces of the first recording head 5 and the second recording head 6.

The fourth variation is as follows. The inkjet recording apparatus 1 includes the first recording head 5 and the second recording head 6 that are of line scan type. However, the inkjet recording apparatus of the second embodiment may include recording heads of serial scan type that scan the recording medium X.

The inkjet recording apparatus according to the second embodiment has been described so far with reference to FIGURE.

Third Embodiment: Inkjet Recording Method

An inkjet recording method according to a third embodiment of the present disclosure will be described next with further reference to FIGURE. The inkjet recording method of the third embodiment includes ejecting a nonwhite ink toward a recording medium X (nonwhite ink ejection) and ejecting a white ink toward an area of the recording medium X where the nonwhite ink has been ejected (white ink ejection).

The nonwhite ink and the white ink used in the inkjet recording method of the third embodiment are respectively the nonwhite ink and the white ink included in the ink set according to the first embodiment. As such, the inkjet recording method of the third embodiment can inhibit occurrence of unevenness in formed images in image formation on the specific recording medium for the reasons previously described in the first embodiment.

The inkjet recording method of the third embodiment is implemented for example by the inkjet recording apparatus 1 according to the second embodiment. In the nonwhite ink ejection, the first recording head 5 ejects the nonwhite ink toward the recording medium X. In the white ink ejection, the second recording head 6 ejects the white ink toward an area of the recording medium X where the nonwhite ink has been ejected. The inkjet recording method according to the third embodiment has been described so far with reference to FIGURE.

EXAMPLES

The following provides further specific description of the present disclosure through use of Examples. However, the present disclosure is not limited to Examples.

<Preparation of Pigment Dispersion C>

A pigment dispersion C for use in cyan ink production was prepared by the following method. A pre-dispersion was yielded by mixing 15 parts by mass of a cyan pigment, 10 parts by mass of a pigment dispersion resin, and 75 parts by mass of ion exchange water using a disperser. The cyan pigment used was C.I. Pigment Blue 15:3 ("HELIOGEN (registered Japanese trademark) BLUE D 7088", product of BASF Japan Ltd.). The pigment dispersion resin used was "DISPERBYK-190" produced by BYK Chemie Japan K.K. (solid concentration: 40% by mass, dispersion medium: water). Next, the pre-dispersion was further mixed using a bead mill ("DYNO (registered Japanese trademark) MILL", product of Willy A. Bachofen AG) loaded with zirconia beads with a diameter of 0.3 mm to obtain the pigment dispersion C.

<Preparation of Pigment Dispersion W>

A pigment dispersion W for use in white ink preparation was prepared by the following method. A pre-dispersion was yielded by mixing 30 parts by mass of a white pigment, 20 parts by mass of a pigment dispersion resin, and 50 parts by mass of ion exchange water using a disperser. The white pigment used was rutile type titanium oxide ("CR-50", product of ISHIHARA SANGYO KAISHA, LTD.). The pigment dispersion resin used was "DISPERBYK-190" produced by BYK Chemie Japan K.K. (solid concentration: 40% by mass, dispersion medium: water). Next, the pre-dispersion was further mixed using a bead mill ("DYNO (registered Japanese trademark) MILL", product of Willy A. Bachofen AG) loaded with zirconia beads with a diameter of 0.3 mm to obtain the pigment dispersion W.

<Cyan Ink Production>

Next, cyan inks (CI-1) to (CI-17) were produced. Compositions of these cyan inks are shown in Tables 1 to 2 which will be described later.

(Production of Cyan Ink (CI-1))

Components were mixed using a stirrer so as to achieve the composition shown in the column titled "(CI-1)" for "Cyan ink" in Table 1. Specifically, 20.00 parts by mass of the pigment dispersion C, 7.00 parts by mass of a binder resin, 0.02 parts by mass of sodium carboxymethylcellulose, 10.00 parts by mass of dipropylene glycol mnonomethyl ether, 5.00 parts by mass of propylene glycol, 0.80 parts by mass of a surfactant, and the remaining amount (57.18 parts by mass) of ion exchange water were mixed to yield a mixed liquid. The binder resin used was "SUPERFLEX (registered Japanese trademark) 210" produced by DKS Co. Ltd. (solid component: polyisocyanate being a water-insoluble resin, solid concentration: 35% by mass, dispersion medium: water). The sodium carboxymethylcellulose used was "CMC DAICEL 1330" produced by Daicel Miraizu Ltd. The surfactant used was "SURFYNOL (registered Japanese trademark) 420" produced by Nissin Chemical Industry Co., Ltd. (active component concentration: 100% by mass, HLB value: 4). Next, the mixed liquid was filtered using a membrane filter with a pore size of 5 µm to obtain a cyan ink (CI-1).

(Production of Cyan Inks (CI-2) to (CI-17))

Cyan inks (CI-2) to (CI-17) were produced according to the same method as that for producing the cyan ink (CI-1) in all aspects other than that components were mixed so as to achieve the compositions shown in the columns titled "(CI-2)" to "(CI-17)" for "Cyan ink" in Table 1.

<White Ink Production>

Next, white inks (WI-1) to (WI-4) were produced. Compositions of these white inks are shown in Table 3 which will be described later. The white inks (WI-1) to (WI-4) were produced according to the same method as that for producing the cyan ink (CI-1) in all aspects other than that components were mixed so as to achieve the compositions shown in the columns titled "(WI-1)" to "(WI-4)" for "White ink" in Table 3.

<Surface Tension Measurement>

The surface tension of each ink was measured based on the Wilhelmy plate method in an environment at 25° C. using a surface tensiometer ("DY-300", product of Kyowa Interface Science Co., Ltd., automatic surface tensiometer). Measurement results are shown in Tables 1 to 4.

<Viscosity Measurement>

The viscosity of each ink was measured in an environment at 25° C. using a vibration type viscometer ("VM-10A", product of SEKONIC CORPORATION). Measurement results are shown in Tables 1 to 4.

<Evaluation of Inhibition of Occurrence of Unevenness>

In evaluation of inhibition of occurrence of unevenness, an inkjet recording apparatus (prototype produced by KYOCERA Document Solutions Inc.) including a first recording head and a second recording head was used as an evaluation apparatus. Each of the first recording head and the second recording head used was a recording head of line scan type ("KJ4B-1200", product of KYOCERA Corporation). The first recording head was located upstream of the second recording head in terms of a conveyance direction of a recording medium. The distance between the first recording head and the second recording head was 5 cm. With respect to each of the cyan inks and each of the white inks, the cyan ink was loaded in the first recording head and the white ink was loaded in the second recording head. The ejection amount per pixel of the cyan ink from the first recording head and the ejection amount per pixel of the white ink from the second recording head each were set to 3 pL. The conveyance speed of the recording medium was set to 20 m/min.

The cyan ink was ejected from the first recording head and the white ink was ejected from the second recording head toward one sheet of film ("LUMIRROR (registered Japanese trademark) S10 #50", product of Toray Industries, Inc., PET film) in an environment at a temperature of 23° C. and a relative humidity of 50% using the aforementioned evaluation apparatus. In the manner described above, a cyan solid image with a width of 3 cm and a length of 3 cm was printed on the film and a white solid image with a width of 3 cm and a length of 3 cm was printed on the printed cyan solid image. Next, the film with a layered image printed thereon including the cyan solid image and the white solid image on the cyan solid image was dried at a temperature of 80° C. for one minute using a dryer to obtain an evaluation film. The layered image printed on the evaluation film was observed with the naked eye from the side opposite to the printing side (side toward which the nonwhite ink and the white ink have been ejected) of the film, and whether or not unevenness has occurred in the layered image was evaluated according to the following criteria. Note that streak unevenness referred to in the following criteria means unevenness with a white streak in a cyan solid image. Evaluation results are shown in Table 4. An ink set with a rating of A was determined to be acceptable while an ink set with a rating of any of B1 to B3 was determined to be unacceptable.

(Evaluation Criteria for Inhibition of Occurrence of Unevenness)

A: No unevenness occurred in the formed layered image.

B1: Shaded unevenness occurred in the cyan solid image.

B2: Streak unevenness occurred in the cyan solid image.

B3: The white ink did not spread and the cyan solid image appeared to be uneven.

Note that the terms in Tables 1 to 3 mean as follows.

Part: Parts by mass

Binder resin: Emulsion ("SUPERFLEX (registered Japanese trademark) 210", product of DKS Co. Ltd., solid component: polyisocyanate being a water-insoluble resin, solid concentration: 35% by mass, dispersion medium: water) of self-emulsified urethane resin CMC1330: Sodium carboxymethylcellulose ("CMC DAICEL 1330", product of Daicel Miruizu Ltd., degree of esterification: 1.3)

CMC1250: Sodium carboxymethylcellulose ("CMC DAICEL 1250", product of Daicel Miraizu Ltd., degree of esterification: 0.9)

Surfynol 420: Acetylene surfactant ("SURFYNOL (registered Japanese trademark) 420", product of Nissin Chemical Industry Co., Ltd., active component concentration: 100% by mass, HLB value: 4)

Surfynol 440: Acetylene surfactant (SURFYNOL (registered Japanese trademark) 440, product of Nissin Chemical Industry Co., Ltd., active component concentration: 100% by mass, HLB value: 8)

Water: Ion exchange water

Rest: An amount that makes the total mass of the components in the corresponding ink 100.00 parts by mass For example, the amount of the ion exchange water contained in the ink (CI-1) is 57.18 parts by mass (=100.00−(20.00+7.00+0.02+10.00+5.00+0.80)).

—: No containment of a corresponding component

Furthermore, the terms in Table 4 mean as follows.

Unevenness: Evaluation result of inhibition of occurrence of unevenness

—: No evaluation being done for a combination of the cyan ink and the white ink because unevenness occurred in a formed cyan solid image when the cyan solid image was formed with only the cyan ink without using the white ink

TABLE 1

| Cyan ink | | CI-1 | CI-2 | CI-3 | CI-4 | CI-5 | CI-6 | CI-7 | CI-8 | CI-9 |
|---|---|---|---|---|---|---|---|---|---|---|
| Pigment dispersion C | [part] | 20.00 | 20.00 | 20.00 | 20.00 | 20.00 | 20.00 | 20.00 | 20.00 | 20.00 |
| Binder resin | [part] | 7.00 | 7.00 | 7.00 | 7.00 | 7.00 | 7.00 | 7.00 | 7.00 | 7.00 |
| CMC1330 | [part] | 0.02 | 0.12 | 0.01 | 0.13 | 0.03 | 0.03 | 0.02 | 0.02 | 0.02 |
| CMC1250 | [part] | — | — | — | — | — | — | — | — | — |
| Dipropylene glycol monomethyl ether | [part] | 10.00 | 10.00 | 10.00 | 10.00 | — | — | — | — | 5.00 |
| Propylene glycol monomethyl ether | [part] | — | — | — | — | 10.00 | — | — | — | — |
| Propylene glycol monopropyl ether | [part] | — | — | — | — | — | 10.00 | — | — | — |
| Dipropylene glycol monopropyl ether | [part] | — | — | — | — | — | — | 10.00 | — | — |
| Triethylene glycol monobutyl ether | [part] | — | — | — | — | — | — | — | 10.00 | 5.00 |
| Propylene glycol | [part] | 5.00 | 5.00 | 5.00 | 5.00 | 5.00 | 5.00 | 5.00 | 5.00 | 5.00 |
| Surfynol 420 | [part] | 0.80 | 0.30 | 0.85 | 0.25 | 0.80 | 0.40 | 0.40 | 0.40 | 0.40 |
| Water | [part] | Rest | Rest | Rest | Rest | Rest | Rest | Rest | Rest | Rest |
| Total | [part] | 100.00 | 100.00 | 100.00 | 100.00 | 100.00 | 100.00 | 100.00 | 100.00 | 100.00 |
| Surface tension | [mN/m] | 30 | 40 | 29 | 41 | 31 | 34 | 33 | 36 | 37 |
| Viscosity | [mPa·s] | 5.0 | 10.0 | 4.5 | 10.5 | 5.3 | 5.4 | 5.1 | 5.3 | 5.2 |

TABLE 2

| Cyan ink | | CI-10 | CI-11 | CI-12 | CI-13 | CI-14 | CI-15 | CI-16 | CI-17 |
|---|---|---|---|---|---|---|---|---|---|
| Pigment dispersion C | [part] | 20.00 | 20.00 | 20.00 | 20.00 | 20.00 | 20.00 | 20.00 | 20.00 |
| Binder resin | [part] | 7.00 | 7.00 | 7.00 | 7.00 | 7.00 | 7.00 | 7.00 | 7.00 |
| CMC1330 | [part] | 0.02 | 0.01 | 0.12 | 0.13 | — | 0.02 | 0.02 | 0.03 |
| CMC1250 | [part] | — | — | — | — | 0.04 | — | — | — |
| Dipropylene glycol monomethyl ether | [part] | 10.00 | 10.00 | 10.00 | 10.00 | 10.00 | — | 2.80 | 22.00 |
| Propylene glycol monomethyl ether | [part] | — | — | — | — | — | — | — | — |
| Propylene glycol monopropyl ether | [part] | — | — | — | — | — | — | — | — |
| Dipropylene glycol monopropyl ether | [part] | — | — | — | — | — | — | — | — |
| Triethylene glycol monobutyl ether | [part] | — | — | — | — | — | — | — | — |
| Propylene glycol | [part] | 5.00 | 5.00 | 5.00 | 5.00 | 5.00 | 5.00 | 5.00 | 5.00 |
| Surfynol 420 | [part] | 0.85 | 0.80 | 0.25 | 0.30 | 0.80 | 0.80 | 0.80 | 0.70 |
| Water | [part] | Rest | Rest | Rest | Rest | Rest | Rest | Rest | Rest |
| Total | [part] | 100.00 | 100.00 | 100.00 | 100.00 | 100.00 | 100.00 | 100.00 | 100.00 |
| Surface tension | [mN/m] | 29 | 30 | 41 | 40 | 30 | 31 | 32 | 30 |
| Viscosity | [mPa·s] | 5.0 | 4.5 | 10.0 | 10.5 | 5.6 | 5.1 | 5.1 | 5.3 |

TABLE 3

| White ink | | WI-1 | WI-2 | WI-3 | WI-4 |
|---|---|---|---|---|---|
| Pigment dispersion W | [part] | 50.00 | 50.00 | 50.00 | 50.00 |
| Binder resin | [part] | 5.00 | 5.00 | 5.00 | 5.00 |
| CMC1330 | [part] | — | 0.10 | 0.01 | 0.11 |
| Triethylene glycol | | 15.00 | 15.00 | 15.00 | 15.00 |
| Surfynol 440 | [part] | 1.00 | 0.50 | 9.50 | 4.50 |
| Water | [part] | Rest | Rest | Rest | Rest |
| Total | [part] | 100.00 | 100.00 | 100.00 | 100.00 |
| Surface tension | [mN/m] | 25 | 35 | 26 | 36 |
| Viscosity | [mPa·s] | 3.0 | 8.0 | 3.5 | 8.5 |

TABLE 4

| | Ink set | Cyan ink | Surface tension Tc [mN/m] | Viscosity Vc [mPa·s] | White ink | Surface tension Tw [mN/m] | Viscosity Vw [mPa·s] | Tc − Tw [mN/m] | Vc − Vw [mPa·s] | Unevenness |
|---|---|---|---|---|---|---|---|---|---|---|
| Example 1 | A-1 | CI-1 | 30 | 5.0 | WI-1 | 25 | 3.0 | 5 | 2.0 | A |
| Example 2 | A-2 | CI-2 | 40 | 10.0 | WI-2 | 35 | 8.0 | 5 | 2.0 | A |
| Example 3 | A-3 | CI-5 | 31 | 5.3 | WI-1 | 25 | 3.0 | 6 | 2.3 | A |
| Example 4 | A-4 | CI-6 | 34 | 5.4 | WI-1 | 25 | 3.0 | 9 | 2.4 | A |
| Example 5 | A-5 | CI-7 | 33 | 5.1 | WI-1 | 25 | 3.0 | 8 | 2.1 | A |
| Example 6 | A-6 | CI-8 | 36 | 5.3 | WI-1 | 25 | 3.0 | 11 | 2.3 | A |
| Example 7 | A-7 | CI-9 | 37 | 5.2 | WI-1 | 25 | 3.0 | 12 | 2.2 | A |
| Example 8 | A-8 | CI-14 | 30 | 5.6 | WI-1 | 25 | 3.0 | 5 | 2.6 | A |
| Example 9 | A-9 | CI-16 | 32 | 5.1 | WI-1 | 25 | 3.0 | 7 | 2.1 | A |
| Example 10 | A-10 | CI-17 | 30 | 5.3 | WI-1 | 25 | 3.0 | 5 | 2.3 | A |
| Comparative Example 1 | B-1 | CI-3 | 29 | 4.5 | — | — | — | — | — | B1 |
| Comparative Example 2 | B-2 | CI-4 | 41 | 10.5 | — | — | — | — | — | B2 |
| Comparative Example 3 | B-3 | CI-1 | 30 | 5.0 | WI-3 | 26 | 3.5 | 4 | 1.5 | B3 |
| Comparative Example 4 | B-4 | CI-2 | 40 | 10.0 | WI-4 | 36 | 8.5 | 4 | 1.5 | B3 |
| Comparative Example 5 | B-5 | CI-10 | 29 | 5.0 | — | — | — | — | — | B1 |
| Comparative Example 6 | B-6 | CI-11 | 30 | 4.5 | — | — | — | — | — | B1 |
| Comparative Example 7 | B-7 | CI-12 | 41 | 10.0 | — | — | — | — | — | B2 |
| Comparative Example 8 | B-8 | CI-13 | 40 | 10.5 | — | — | — | — | — | B2 |
| Comparative Example 9 | B-9 | CI-15 | 31 | 5.1 | — | — | — | — | — | B1 |

As shown in Table 4, the cyan ink (CI-3) of the ink set (B-1) had a surface tension Tc of less than 30 mN/m and a viscosity Vc of less than 5.0 mPa·s. The cyan ink (CI-4) of the ink set (B-2) had a surface tension Tc of greater than 40 mN/m and a viscosity Vc of greater than 10.0 mPa·s. The ink set (B-3) had a Tc−T value of less than 5 mN/m and a Vc−Vw value of less than 2.0 mPa·s. The ink set (B-4) had a Tc−Tw value of less than 5 mN/m and a Vc−Vw value of less than 2.0 mPa·s. The cyan ink (CI-10) of the ink set (B-5) had a surface tension Tc of less than 30 mN/m. The cyan ink (CI-11) of the ink set (B-6) had a viscosity Vc of less than 5.0 mPa·s. The cyan ink (CI-12) of the ink set (B-7) had a surface tension Tc of greater than 40 mN/m. The cyan ink (CI-13) of the ink set (B-8) had a viscosity Vc of greater than 10.0 mPa·s. The cyan ink (CI-15) of the ink set (B-9) did not contain glycol ether. As a result, the image formed with any of the ink sets (B-1) to (B-9) on the specific recording medium was rated as any of B1 to B3, which means that unevenness occurred in the formed image.

By contrast, each of the ink sets (A-1) to (A-10) had the following features as shown in Tables 1 to 4. The nonwhite ink (specifically, the cyan ink) contained a nonwhite pigment, a first polysaccharide, glycol ether, and water. The white ink contained a white pigment and water. The nonwhite ink had a surface tension Tc of at least 30 mN/m and no greater than 40 mN/m. The Tc−Tw value was at least 5 mN/m. The nonwhite ink had a viscosity Vc of at least 5.0 mPa·s and no greater than 10.0 mPa·s. The Vc−Vw value was at least 2.0 mPa·s. As a result, the image formed with any of the ink sets (A-1) to (A-10) on the specific recording medium was rated as A, which means that occurrence of unevenness was inhibited in the formed image.

From the above, it can be determined that the ink set according to the present disclosure that encompasses the ink sets (A-1) to (A-10) can inhibit occurrence of unevenness in a formed image in image formation on the specific recording medium. Furthermore, the inkjet recording apparatus and the inkjet recording method according to the present disclosure that use the ink set as above can inhibit occurrence of unevenness in a formed image in image formation on the specific recording mediun.

What is claimed is:

1. An inkjet set comprising:
   nonwhite ink; and
   a white ink, wherein
   the nonwhite ink contains a nonwhite pigment, a first polysaccharide, glycol ether, and water,
   the white ink contains a white pigment and water,
   the nonwhite ink has a first surface tension at 25° C. of at least 30 mN/m and no greater than 40 mN/m,
   the first surface tension of the nonwhite ink and a second surface tension at 25° C. of the white ink satisfy formula (1),
   the nonwhite ink has a first viscosity at 25° C. of at least 5.0 mPa·s and no greater than 10.0 mPa·s, and
   the first viscosity of the nonwhite ink and a second viscosity at 25° C. of the white ink satisfy formula (2):

$$5 \text{ mN/m} \leq Tc - Tw \quad (1)$$

$$2.5 \text{ mPa·s} \leq Vc - Vw \quad (2)$$

where in the formula (1), Tc represents the first surface tension of the nonwhite ink and Tw represents the second surface tension of the white ink, and
in the formula (2), Vc represents the first viscosity of the nonwhite ink and Vw represents the second viscosity of the white ink.

2. The inkjet ink set according to claim 1, wherein the white ink contains no glycol ether.

3. The inkjet ink set according to claim 1, wherein
the glycol ether contained in the nonwhite ink is at least one selected from the group consisting of propylene glycol monomethyl ether, propylene glycol monopropyl ether, dipropylene glycol monomethyl ether, dipropylene glycol monopropyl ether, and triethylene glycol monobutyl ether.

4. The inkjet ink set according to claim 1, wherein
the first polysaccharide contained in the nonwhite ink is a cellulose derivative or a salt thereof.

5. The inkjet ink set according to claim 1, wherein
an amount of the first polysaccharide is at least 0.02 parts by mass and no greater than 0.12 parts by mass relative to 100.00 parts by mass of the nonwhite ink, and
the white ink does not contain a second polysaccharide, or
the white ink further contains the second polysaccharide, the amount of the second polysaccharide being greater than 0.00 parts by mass and no greater than 0.10 parts by mass relative to 100.00 parts by mass of the white ink.

6. The inkjet ink set according to claim 1, wherein
the nonwhite ink further contains a first surfactant, an amount of the first surfactant being at least 0.30 parts by mass and no greater than 0.80 parts by mass relative to 100.00 parts by mass of the nonwhite ink, and
the white ink further contains a second surfactant, an amount of the second surfactant being at least 0.50 parts by mass and no greater than 1.00 part by mass relative to 100.00 parts by mass of the white ink.

7. The inkjet ink set according to claim 1, wherein
the nonwhite ink and the white ink each further contain a water-insoluble resin.

8. The inkjet ink set according to claim 1, wherein the formula (2) is $$2.5 \text{ mPa·s} \leq Vc - Vw \leq 2.6 \text{ mPa} \tag{2}.$$

9. An inkjet recording apparatus comprising:
a first recording head that ejects a nonwhite ink toward a recording medium; and
a second recording head that ejects a white ink toward an area of the recording medium where the nonwhite ink has been ejected, wherein
the nonwhite ink contains a nonwhite pigment, a first polysaccharide, glycol ether, and water,
the white ink contains a white pigment and water,
the nonwhite ink has a first surface tension at 25° C. of at least 30 mN/m and no greater than 40 mN/m,
the first surface tension of the nonwhite ink and a second surface tension at 25° C. of the white ink satisfy formula (1),
the nonwhite ink has a first viscosity at 25° C. of at least 5.0 mPa·s and no greater than 10.0 mPa·s, and
the first viscosity of the nonwhite ink and a second viscosity at 25° C. of the white ink satisfy formula (2):

$$5 \text{ mN/m} \leq Tc - Tw \tag{1}$$

$$2.5 \text{ mPa·s} \leq Vc - Vw \tag{2}$$

where in the formula (1), Tc represents the first surface tension of the nonwhite ink and Tw represents the second surface tension of the white ink, and
in the formula (2), Vc represents the first viscosity of the nonwhite ink and Vw represents the second viscosity of the white ink.

10. The inkjet recording apparatus according to claim 9, wherein the formula (2) is $$2.5 \text{ mPa·s} \leq Vc - Vw \leq 2.6 \text{ mPa} \tag{2}.$$

11. An inkjet recording method comprising:
ejecting a nonwhite ink toward a recording medium; and
ejecting a white ink toward an area of the recording medium where the nonwhite ink has been ejected, wherein
the nonwhite ink contains a nonwhite pigment, a first polysaccharide, glycol ether, and water,
the white ink contains a white pigment and water,
the nonwhite ink has a first surface tension at 25° C. of at least 30 mN/m and no greater than 40 mN/m,
the first surface tension of the nonwhite ink and a second surface tension at 25° C. of the white ink satisfy formula (1),
the nonwhite ink has a first viscosity at 25° C. of at least 5.0 mPa·s and no greater than 10.0 mPa·s, and
the first viscosity of the nonwhite ink and a second viscosity at 25° C. of the white ink satisfy formula (2):

$$5 \text{ mN/m} \leq Tc - Tw \tag{1}$$

$$2.5 \text{ mPa·s} \leq Vc - Vw \tag{2}$$

where in the formula (1), Tc represents the first surface tension of the nonwhite ink and Tw represents the second surface tension of the white ink, and
in the formula (2), Vc represents the first viscosity of the nonwhite ink and Vw represents the second viscosity of the white ink.

12. The inkjet recording method according to claim 11, wherein the formula (2) is $$2.5 \text{ mPa·s} \leq Vc - Vw \leq 2.6 \text{ mPa} \tag{2}.$$

* * * * *